June 24, 1924.
F. T. LAHEY
STORAGE BATTERY
Filed July 10, 1922
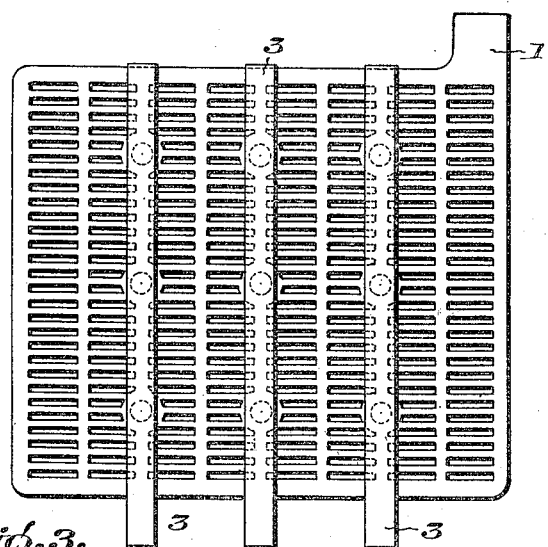
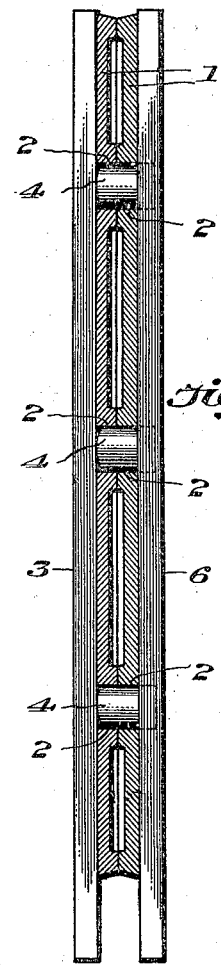
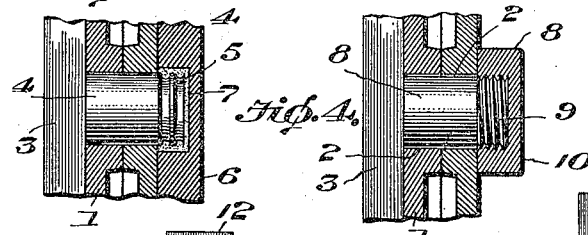
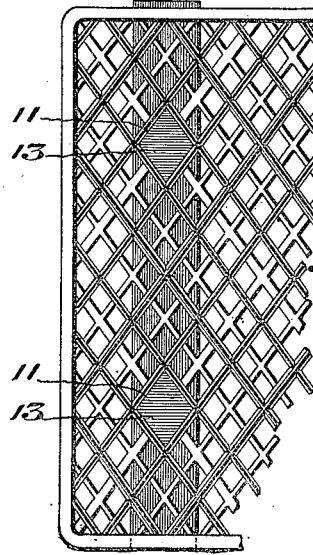
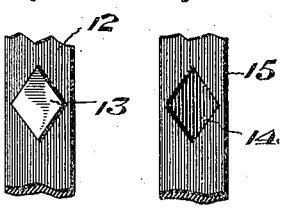
Inventor
Frank T. Lahey
By
Attorney Patented June 24, 1924.

1,498,554

UNITED STATES PATENT OFFICE.

FRANK T. LAHEY, OF AKRON, OHIO.

STORAGE BATTERY.

Application filed July 10, 1922. Serial No. 573,911.

*To all whom it may concern:*

Be it known that I, FRANK T. LAHEY, a citizen of the United States, residing at Akron, in the county of Summit, State of Ohio, have invented certain new and useful Improvement in Storage Batteries, of which the following is a specification.

The present invention relates to storage batteries being particularly directed to batteries which contain separators composed of a plurality of strips of hard rubber, rubber composition or any suitable insulating material, which are attached to the plates and in some instances extend below the plate and serve to support the battery elements.

In my prior application, Serial Number 558,641, filed May 5, 1922, there is shown and described a form of battery element in which the separator strips are vulcanized in position. While this construction is satisfactory, it requires the installation of vulcanizing equipment in the battery stations. It is the object of the present invention to modify the prior construction referred to, so that the improved separators can be applied to battery plates without the use of vulcanizing equipment, and so that it can be applied to existing plates, thus doing away with the ordinary wood separators, both in original equipment and in replacing or repairing of batteries.

Figure 1 is a side elevation of my improved invention as applied to one type of battery plate, the double plate construction, such, for example, as that shown in the prior Roberts Patent Number 1,414,710, dated May 2, 1922.

Figure 2 is a vertical section through one of these elements.

Figure 3 is an enlarged section at the connecting pin.

Figure 4 is a similar view of a modification of Figure 3.

Figure 5 is a view showing the manner in which the invention may be applied to another type of battery plate.

Figure 6 is an end view of Figure 5.

Figures 7 and 8 are views of the male and female portion of the separator strips shown in Figures 5 and 6.

In the form of the invention shown in Figures 1, 2 and 3, the battery plates of the form shown in the Roberts patent are indicated by the numeral 1. These are usually of any preferred form of grid-work and at selected points are provided with apertures or openings 2, of any shape or size, which are preferably arranged in vertical rows.

The separators are in the form of strips 3, which may extend below the lower edge of the battery element in order to support it, although this is not necessary. From one side of the strips 3 are extended pins 4 which project through the holes 2 to form the male element of the connection.

In the form of the invention shown in Figure 3, the projecting pin is provided with a series of grooves 5. The other side of the battery element is provided with a second insulating strip 6 in the face of which are formed recesses 7 to receive the projecting pins 4. An adhesive may be placed in the pockets or recesses 7 to form a union between the male and female elements. This adhesive may be of any desired kind, asphalt being suitable for this purpose.

As a modification of this form of the invention, the strips 3 may be provided with pins 8, the ends of which that project beyond the plates being screw threaded as at 9. In this embodiment of the invention screw threaded caps 10 may be substituted for the strip 6.

In Figures 5 to 8 inclusive, there is shown another form of the invention, suitable for use with a well known type of battery plate 20. This type of plate is provided with parallel, oppositely faced ribs which are diagonally arranged to form diamond-shaped apertures. In adapting my invention to this type of plate, the battery maker may remove certain of the ribs to form through diamond-shaped openings 11. The separator strips 12 are formed with similar shaped projections 13. When the plate and separator strips are assembled, the projecting male members are received in sockets or pockets 14 in the oppositely positioned strip 15. The strips are then connected together by any suitable adhesive.

The above illustrates two methods by which my invention may be utilized so that the vertical separator strips may be available for the types of battery plates shown. Where the form of plates differ, the projections may be varied to suit the particular conditions. Such modifications and variations are within the scope of my invention, the purpose of which is to modify the separator plates for any type of battery plate, in order that they may be applied with the least labor and be efficient for the uses and purposes set forth.

What I claim is:

1. In a battery construction, a plate having an aperture therein, a separator strip at one side of the plate, a projection on the strip adapted to pass through the aperture, and a member on the opposite side of the plate having a recess adapted to receive and retain the projection.

2. In a battery construction, a plate having an aperture therein, a separator at one side of the plate, a male member integral with the separator adapted to project through the aperture, and a female member on the opposite side of the plate adapted to receive and retain the male member.

3. In a battery construction, a plate having apertures therein, a separator strip at one side of the plate, a number of projections on said strip adapted to pass through the apertures, and a second separator strip on the opposite side of the plate having recesses therein to receive and retain the projections.

4. In a battery construction, a plate having apertures therein, a separator strip at one side of the plate, a number of integral projections on said strip adapted to be passed through the apertures, and a socketed member on the opposite side of the plate to receive the projections.

5. In a battery construction, a plate having apertures therein, a separator strip at one side of the plate, a plurality of integral projections on said strip adapted to be passed through the apertures, a second strip on the opposite side of the plate said second strip having sockets therein, and means to adhesively retain the projections in the sockets.

FRANK T. LAHEY.